Jan. 7, 1969  P. J. KIRCHER  3,421,142
CIRCUIT TO INDICATE PRESENCE OF CHARGING CURRENT
Filed June 13, 1966

INVENTOR
Paul J. Kircher
BY B.B.Sklar, Jr.
AGENT

United States Patent Office 3,421,142
Patented Jan. 7, 1969

3,421,142
CIRCUIT TO INDICATE PRESENCE OF CHARGING CURRENT
Paul J. Kircher, Mansfield, Ohio, assignor to Westinghouse Electric Corporation, Pittsburgh, Pa., a corporation of Pennsylvania
Filed June 13, 1966, Ser. No. 557,037
U.S. Cl. 320—48    4 Claims
Int. Cl. H02j 7/04

ABSTRACT OF THE DISCLOSURE

A battery-operated appliance and charging structure therefor which is provided with visual indicating means supported in the charging structure for indicating the presence or absence of current flow in the charging circuit and which further indicates proper contact or coupling between contacts carried by the appliance and contacts carried by the charger.

---

This invention relates, in general, to motorized appliances utilizing a rechargeable battery as a source of power and, more particularly to battery charging apparatus for use therewith.

Almost, if not all, rechargeable appliances are provided with a charging unit which is adapted to be plugged into a wall outlet of some sort. In numerous instances the charger is used in conjunction with an electrical outlet which is controlled by a switch. The fact that one does not readily know whether such an outlet is alive or that it will remain so far the period required for charging or recharging may lead to great inconvenience and annoyance to the user.

Furthermore, even if the charger is plugged into a live outlet, the battery of the appliance may not become charged because of lack of adequate coupling between the primary circuit in the charger and the secondary circuit including the battery in the appliance. For example, where contacts are used for coupling, the contacts may be corroded or more simply in an unclean condition. Where a flux coupling as between the primary winding and the secondary winding of a step-down transformer, the former being disposed in the charger and the latter in the appliance, is utilized, there may be misalignment of the windings or improper spacing therebetween.

Accordingly, the general object of this invention is to provide a new and improved battery operated appliance and charging means therefor.

It is a more particular object of this invention to provide, in a charging unit for a battery operated appliance, means for simultaneously indicating when the charger is plugged into a live outlet and when there is proper coupling between the circuit in the appliance and the circuit in the charging unit.

Briefly, the present invention accomplishes the above-cited objects by providing a charging unit comprising, in addition to a pair of electrical contacts adapted to engage contacts carried by an appliance with which it is used, an incandescent lamp circuit comprising a pair of electrically conducting terminals adapted to engage the conductors carried by the appliance. The lamp thereby provides visual means for indicating flow of current from the source and also between the contacts of the appliance and the charger.

Figure 1:
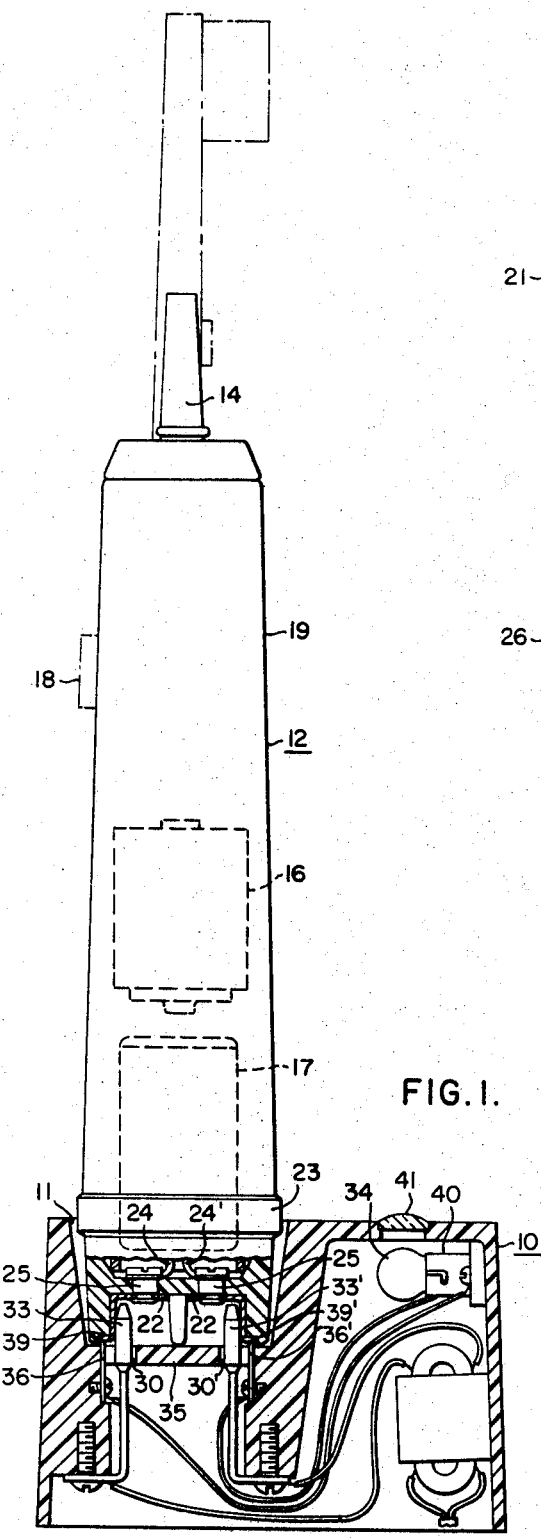
Figure 2:
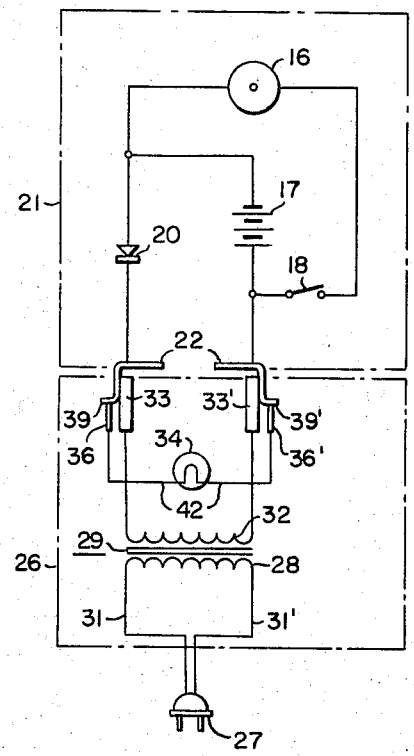

These and other objects and advantages of the present invention will become more apparent when considered in view of the following description and drawings, in which:

FIGURE 1 is a side elevational view of a battery operated toothbrush and charging unit incorporating the invention; and
FIG. 2 is a schematic view of a battery charging circuit incorporating the invention.

Referring to the drawings, especially FIGURE 1, reference character 10 designates generally a storage case and battery charger made from any suitable electrically non-conducting material, for example, plastic, and having a recess or socket 11 adapted to receive one end of a motorized toothbrush or power handle 12.

The upper end of the power handle 12 includes a post or toothbrush holding member 14 adapted to be set in motion by meeans of a suitable electric motor 16. Power is supplied to the motor 16 by means of a nickel-cadmium rechargeable battery 17 through a manually operable switch 18 conveniently supported by an upper housing member 19 of the power handle 12. The motor 16 and battery 17 being disposed all or in part within the housing member 19 are contained in an electrical circuit generally indicated 21, see FIG. 2.

A pair of electrical contacts 22 having a substantially semicircular cup-shape configuration are nestled in the bottom of a lower housing member 23 such that they are accessible from the exterior thereof. The cup-shaped contacts are suitably insulated from each other and are connected to the motor 16 and the battery 17 by suitable electrical leads 24 and 24' and electrically conducting fastening means 25. The storage case or battery charger 10 comprises a circuit 26 including an outlet plug 27 connected to the primary coil 28 of a step-down transformer 29 through power cord conducting wires 31 and 31'. The secondary 32 of the transformer 29 is connected in series with charging contacts 33 and 33'. Engagement of the contacts 22 by the charging contacts 33 and 33' which extend through respective apertures 30 and 30' completes a closed circuit from the secondary 32 through the battery 17 for charging thereof when the plug 27 is inserted in a live outlet. The battery 17 utilizes a relatively low D-C voltage on the order of 1.2 volts, accordingly, the transformer 29 lowers the A-C input to the charger and a diode rectifier 20 contained in the circuit 21 converts the alternating current to D-C current to provide a suitable charging voltage for the battery 17.

In accordance with the present invention an incandescent lamp 34, illustrated schematically in FIGS. 1 and 2, is supported within the charger 10 by means of a suitable bayonet type holder 40 such that the illumination therefrom is readily visible from the exterior of the charger housing, the lamp being adapted to operate from the charging voltage of the battery. A suitable lens 41 is disposed in a conventional manner in the charger housing in front of the lamp 34.

A pair of electrically conducting terminals 36 and 36' mounted in any suitable manner on the charger housing extend through the openings 30 and 31' in the bottom wall 35 of the charger housing 10 and engage respective flange portions 39 and 39' of the cup-shaped contacts 22. The terminals 36 and 36' are connected in series with the lamp 34 by insulated electrical leads 42 and through the contacts 22 complete a closed circuit with the secondary coil or winding 32. It will be understood that the lamp 34 will be illuminated only if the outlet plug 27 is inserted in a live outlet and if there is current flow between the cup-shaped contacts 22 and the charging contacts 33 and 33'.

Since numerous changes may be made in the above-described apparatus and different embodiments of the invention may be made without departing from the spirit thereof, it is intended that all matter contained in the foregoing description or shown in the accompanying drawings, shall be interpreted as illustrative and not in a limiting sense.

What is claimed is:

1. In a battery powered appliance and means for charging the battery, in combination, first circuit means carried by said appliance and including said battery, second circuit means including a power plug connected to said means for charging said battery, means for coupling said first circuit means with said second circuit means, and means in one of said circuit means for indicating the presence of current flow in said second circuit means and coupling of said first circuit means with said second circuit means, said coupling means comprising a first pair of electrical contacts in said first circuit means and a second pair of electrical contacts carried by said second circuit means, said indicating means being included in a normally open loop in said second circuit means and said normally open loop comprises a pair of electrically conducting terminals adapted to engage said first pair of contacts to establish a circuit therethrough and between said indicating means and said charging means.

2. Structure as specified in claim 1, wherein said indicating means comprises an incandescent lamp secured in said charging means so that it is readily visible.

3. Structure as specified in claim 2, wherein said charging means is contained in an electrically non-conducting housing provided with a plurality of spaced apart apertures in a wall thereof, said terminals and said second pair of contacts being supported in said housing such that they extend through said apertures for simultaneously contacting said first pair of contacts.

4. Structure as specified in claim 3, wherein said charging means comprises a step-down transformer supported in said housing.

References Cited

UNITED STATES PATENTS

| | | | |
|---|---|---|---|
| 2,385,620 | 9/1945 | Fleckenstein | 340—252 |
| 2,449,150 | 9/1948 | Schnoll | 340—252 |
| 3,217,224 | 11/1965 | Sherwood | 320—48 X |
| 3,257,599 | 6/1966 | Somers et al. | 320—2 |
| 3,281,636 | 10/1966 | Fleckenstein et al. | 320—2 |
| 3,370,214 | 2/1968 | Aymar | 320—2 |

JOHN F. COUCH, *Primary Examiner.*

S. WEINBERG, *Assistant Examiner.*

U.S. Cl. X.R.

200—167, 51.08, 320—54; 340—252